UNITED STATES PATENT OFFICE.

HOMER T. YARYAN, OF RICHMOND, INDIANA.

IMPROVEMENT IN PROCESSES FOR BLEACHING BEES-WAX.

Specification forming part of Letters Patent No. 190,995, dated May 22, 1877; application filed April 3, 1877.

*To all whom it may concern:*

Be it known that I, HOMER T. YARYAN, of Richmond, in the State of Indiana, have invented a new and useful Process for Bleaching Bees-Wax; and the following is declared to be a correct description of the said process.

Ordinary yellow bees-wax is dissolved in any of the volatile products of petroleum or other solvent, and exposed in shallow vessels covered with glass to the action of sunlight. In the course of from seven to ten days the color is completely discharged, and the solution is placed in suitable distilling apparatus, where the solvent is volatilized and the white wax separated. I prefer to use the volatile product of petroleum volatilizing between 175° and 200° Fahrenheit.

I do not confine myself to the products of petroleum, as other solvents may be used.

I claim as new—

The process of bleaching bees-wax, which consists in dissolving it by any of the volatile products of petroleum, or other known solvents, and exposing the same to sunlight in glass vessels, or in shallow vessels covered with glass, until the color is discharged, and then volatilizing by heat the solvent used.

HOMER T. YARYAN.

Witnesses:
J. J. RUSSELL,
JOHN YARYAN.